United States Patent [19]

DiCarlo et al.

[11] Patent Number: 4,503,685
[45] Date of Patent: Mar. 12, 1985

[54] OIL CONTROL VALVE FOR REFRIGERATION SYSTEM

[75] Inventors: Leonard J. DiCarlo, Maryland Heights; Roland A. Ares, St. Charles; Robert O. Norton, Chesterfield, all of Mo.

[73] Assignee: Hussmann Corporation, Bridgeton, Mo.

[21] Appl. No.: 599,347

[22] Filed: Apr. 12, 1984

Related U.S. Application Data

[62] Division of Ser. No. 442,967, Nov. 19, 1982, Pat. No. 4,478,050.

[51] Int. Cl.³ .............................................. F25B 31/00
[52] U.S. Cl. ........................................ 62/193; 62/212
[58] Field of Search ................ 62/192, 193, 194, 210, 62/212, 84, 468, 470; 137/522

[56] References Cited

U.S. PATENT DOCUMENTS

| 441,995 | 12/1890 | Wheeler | 62/470 |
| 2,665,557 | 1/1954 | Dobson | 62/193 |
| 2,960,845 | 11/1960 | Lange | 62/210 X |
| 3,234,752 | 2/1966 | Quick et al. | 62/192 |
| 3,744,269 | 7/1973 | Oshima et al. | 62/212 |

FOREIGN PATENT DOCUMENTS 116134  2/1930  Austria ................................ 62/470

*Primary Examiner*—Harry B. Tanner
*Attorney, Agent, or Firm*—Richard G. Heywood

[57] ABSTRACT

A pressure regulating valve for use in the oil separation and delivery system of a refrigeration system, including a valve body having an oil inlet chamber for connection with a separated liquid source on the high pressure side of refrigeration system compressor means, an oil outlet adapted for low pressure connection with oil level controls for the compressor means, internal valve means for controlling oil flow between the high side and low side chambers, and movable pressure means responsive to oil outlet pressure and compressor suction pressure acting in opposition for regulating said internal valve means.

15 Claims, 9 Drawing Figures

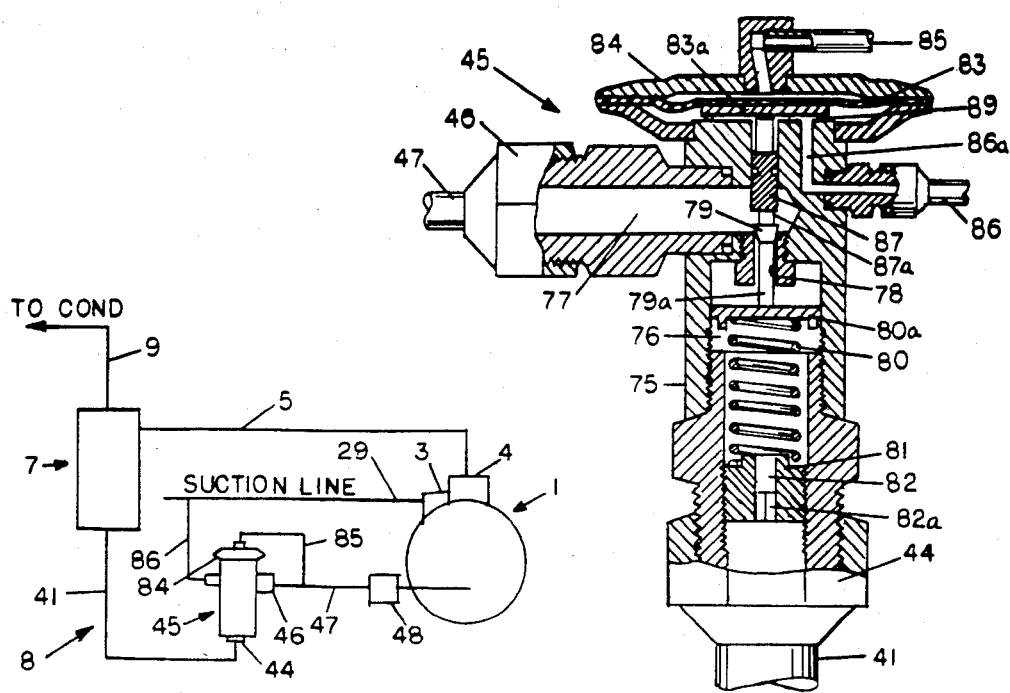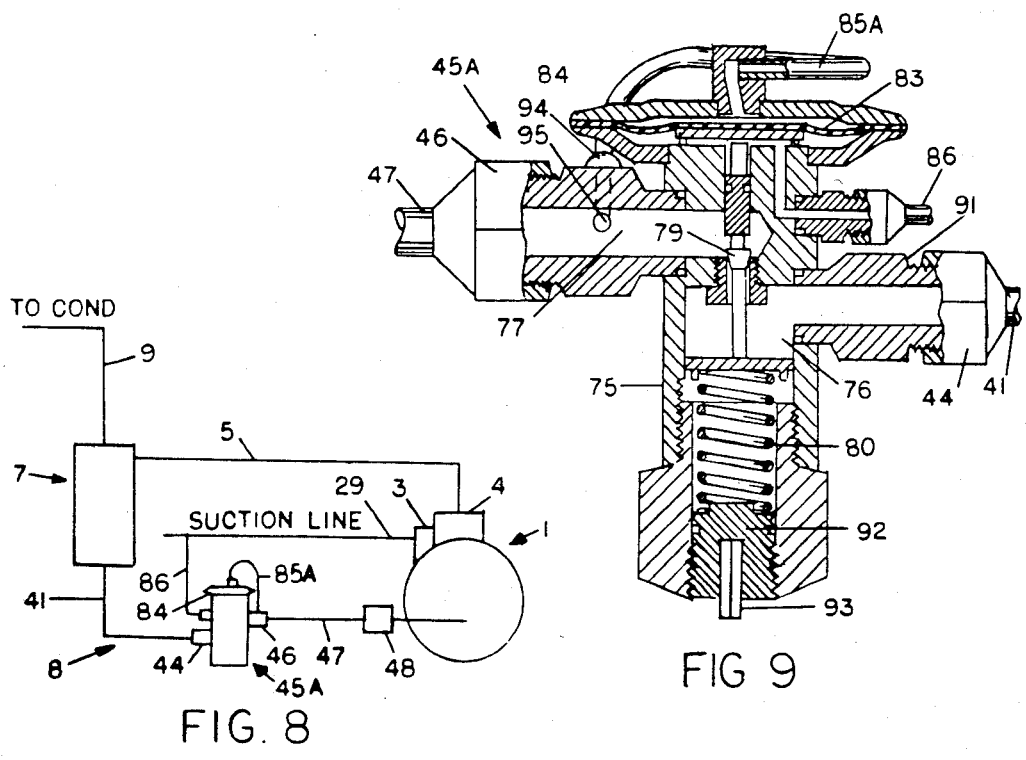

OIL CONTROL VALVE FOR REFRIGERATION SYSTEM

This is a divisional application based upon copending parent application Ser. No. 442,967 filed Nov. 19, 1982, now U.S. Pat. No. 4,478, 050.

BACKGROUND OF THE INVENTION

The invention relates generally to the commercial and industrial refrigeration art, and more particularly to an oil flow control valve for commercial and industrial refrigeration systems.

The maintenance of a proper amount of lubricating oil in the compressor of any refrigeration system obviously is a critical factor to the efficient operation and life span of the compressor. Oil problems are particularly acute in large multiplexed or compounded systems in which multiple compressors operate in parallel or series-piped arrangements and pump into a common discharge header to provide the refrigeration needs of commercial installations, such as supermarkets which have a large number of low and/or normal temperature refrigerated display and storage fixtures, or for industrial installations, such as warehousing having a plurality of different refrigeration requirements.

In all operating refrigeration systems, some amount of oil is entrained in the hot compressed refrigerant vapor discharged by the compressors and generally some oil is present throughout the entire system, including condenser, receiver, evaporator coils, liquid and suction lines, valves, etc. It is clear that compressor lubricating oil serves no useful purpose outside the compressor, that energy is wasted by pushing oil through the refrigeration system, that oil interfers with the heat transfer and efficiency of evaporators and that oil may create system damage due to oil build-up interferring with proper refrigerant distribution, valve operation and the like. Therefore, high side oil traps or separators have been employed between the compressor and condenser to separate the oil from the refrigerant that is passed on to the condenser and thus minimize such oil distribution through the system. It is desired to return the oil in liquid form to the compressors and various high side and low side oil devices have been used, such as sumps, accumulators, pumps, oil float controls, valves and the like.

Refrigerants such as R-12, R-22 and R-502 are miscible with the lubricating oil, and generally some amount of refrigerant will be present in any oil separation system. However, in prior oil separator systems, the cooling of separated oil below the condensing temperature of the gas refrigerant frequently produced excessive refrigerant condensation in and dilution of the oil. Such oil and refrigerant solution results in reduction of lubrication quality and excessive pump-out of the oil into the system. Excessive oil foaming also occurred in some cases of crankcase pressure reduction such as during compressor start-up following a long off-cycle. In addition to problems of inefficient oil-refrigerant separation, a major problem has been the maintenance of proper oil levels between multiple and cyclically operating compressors. A typical solution in the past was to return the oil to the suction header for the compressors and allow the oil to vaporize into the warm refrigerant vapor and flow at random into the compressors without regard to different pumping rates, and then attempt to provide an oil level equalizing connection between the compressor crankcases, such as is disclosed in U.S. Pat. No. 3,140,041. U.S. Pat. No. 3,633,377 also discusses a high side oil separator, accumulator and muffler for a multiple compressor system that approaches some of the oil problems.

While numerous oil separation devices and systems have been developed in the past, efficient oil separation and maintenance of proper oil levels in multiple compressor systems has continued to present oil problems in refrigeration systems.

SUMMARY OF THE INVENTION

The invention is embodied in an oil flow control means for efficient oil separation and return in commercial refrigeration systems and the like having multiple parallel compressors that are cyclically operable to meet the refrigeration demands of the system, the oil flow control means maintaining a predetermined oil level in the compressors and including a pressure differential valve for regulating the flow of oil from an oil separator to the system compressors.

A principal object of the present invention is to provide an oil separation system having a controlled oil delivery to maintain predetermined oil levels for optimum compressor lubrication.

Another object is to provide an oil separation system that obviates oil flooding and starving in the compressor and maintains a substantially constant supply of oil to the compressor crankcase.

It is another object to provide an oil system having efficient pressure responsive valve means for controlled oil delivery to an oil float unit for feeding the compressor crankcase.

Another object is to provide an efficient, easily serviced and economic oil system for a multiple compressor refrigeration system.

These and other objects and advantages will become more apparent hereinafter.

DESCRIPTION OF THE DRAWINGS

For illustration and disclosure purposes the invention is embodied in the parts and the combinations and arrangements of parts hereinafter described. In the accompanying drawings forming a part of the specification and wherein like numerals refer to like parts wherever they occur:

FIG. 6 is a line diagram illustrating an oil separation system connected with one form of pressure differential valve embodying the invention, FIG. 7 is an enlarged cross-sectional view of the embodiment of the pressure differential valve shown in FIG. 6, FIG. 8 is a line diagram illustrating an oil separation system connected with another form of pressure differential valve embodying the invention, and FIG. 9 is an enlarged cross-sectional view of the other embodiment of the pressure differential valve shown in FIG. 8.

DESCRIPTION OF THE PREFERRED EMBODIMENTS

For purposes of disclosure, a closed refrigeration system embodying the invention has been illustrated and will be described as being of the multiplexed type having dual or twin parallel compressors and which might be installed in a supermarket for operating a plurality of separate fixtures, such as refrigerated storage and display cases, but it will be understood and readily apparent to those skilled in the art that such a system may have other numbers and arrangements of compressors and may be adapted to other commercial or industrial installations. The term "high side" is used herein in a conventional refrigeration sense to mean the portion of the system from the compressor discharge to the evaporator expansion valves and the term "low side" means the portion of the system from the expansion valves to the compressor suction.

Figure 1:
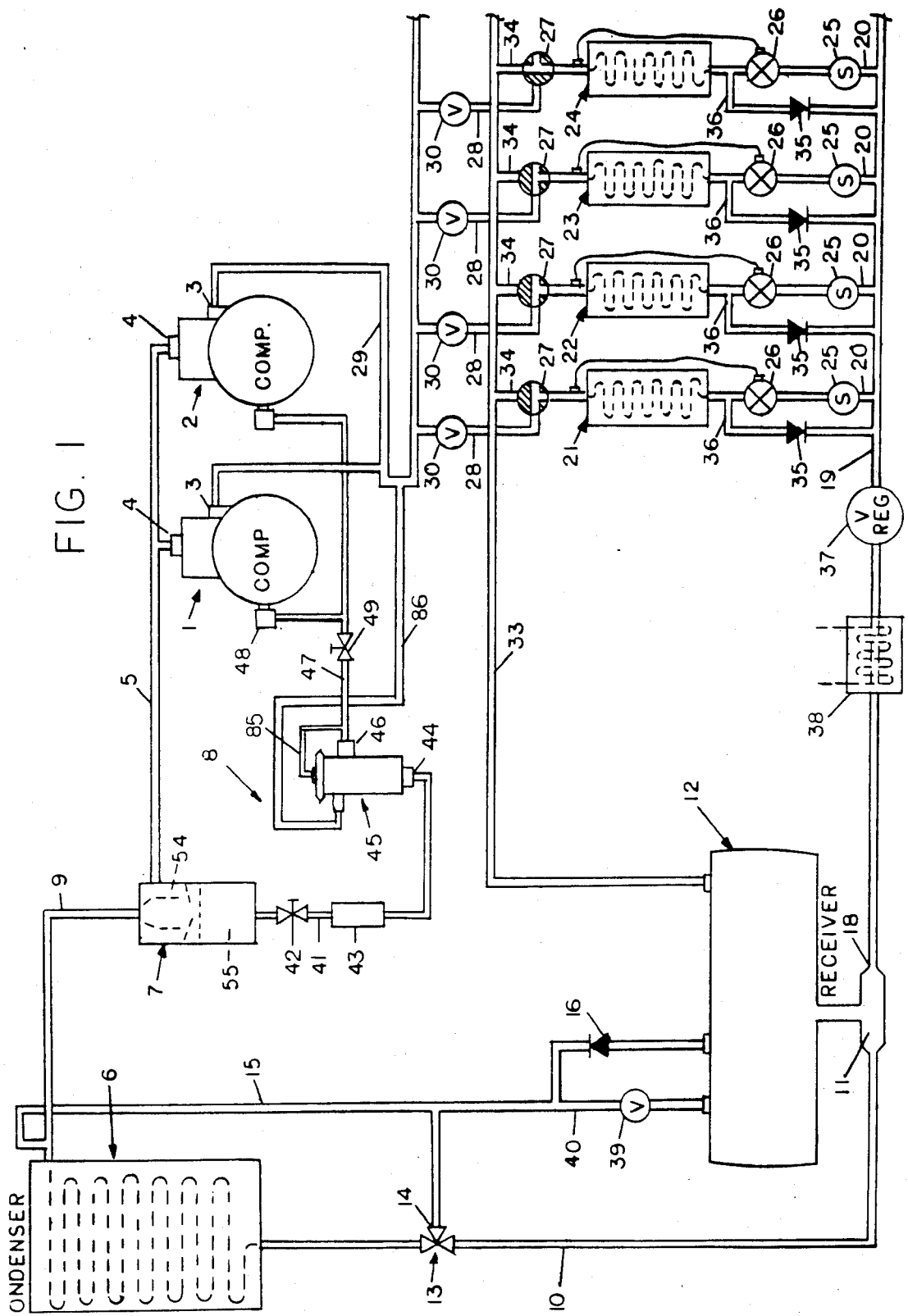
FIG. 1 is a diagrammatic view of a typical refrigeration system embodying the invention.
Figure 2:
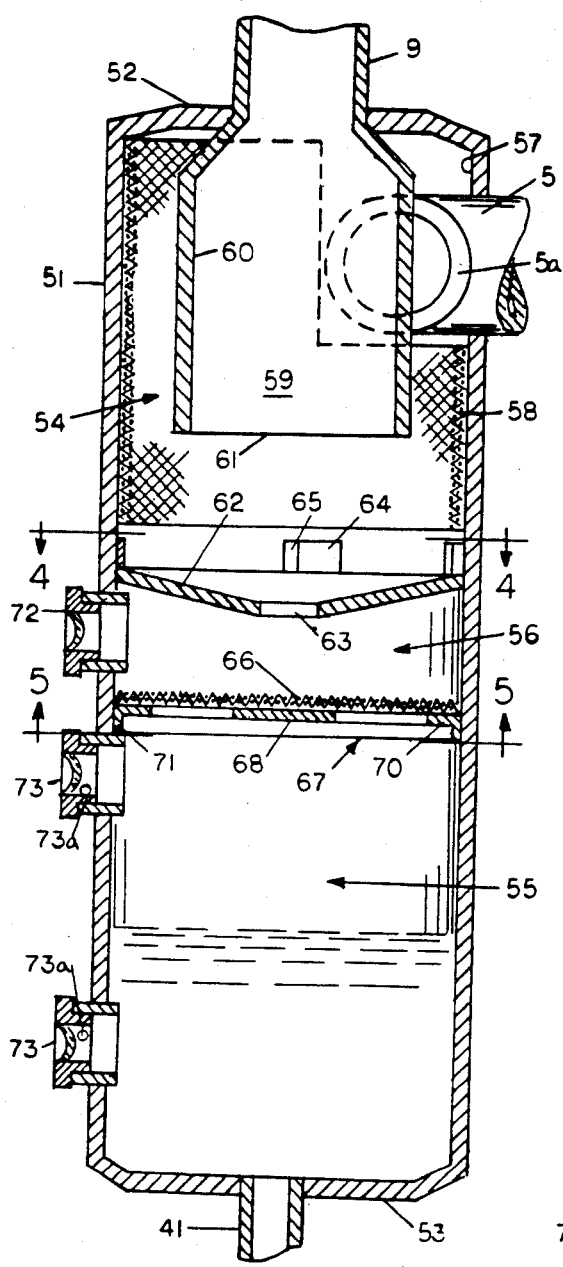
FIG. 2 is an enlarged cross-sectional view of an oil separator and accumulator unit useful with the invention.
Figure 3:
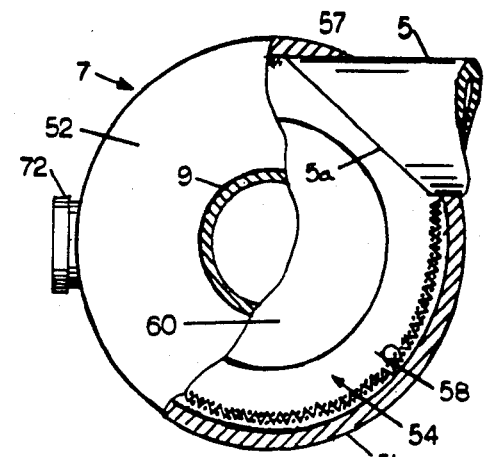
FIG. 3 is a top plane view, partly broken away, of the oil separation unit of FIG. 2.
Figure 4:
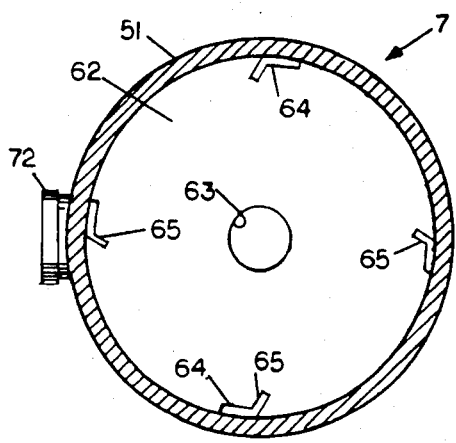
FIG. 4 is a cross-sectional view taken substantially along line 4—4 of FIG. 2.
Figure 5:
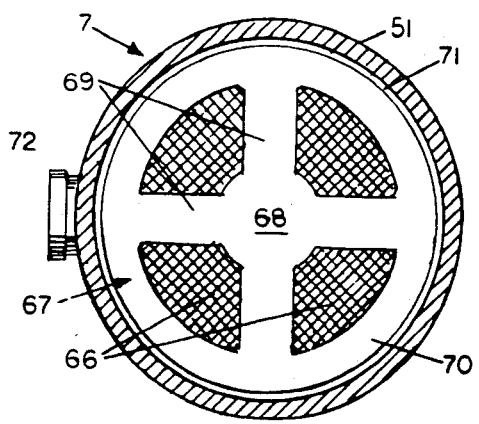
FIG. 5 is a cross-sectional view taken substantially along line 5—5 of FIG. 2.

Referring to FIG. 1, the refrigeration system shown is in part conventional and includes a pair of compressors 1 and 2 connected in parallel and each having a suction or low pressure side with a suction service valve 3 operating at a predetermined suction pressure and having a discharge or high pressure side 4 connected to a common discharge header 5 through which hot compressed gaseous refrigerant is discharged to a condenser 6. The discharge header 5 is connected to an oil separator 7 of an oil separation system 8 embodying the present invention and to be described more fully hereinafter, and a refrigerant outlet from the oil separator 7 is connected to discharge conduit 9 connected to the condenser 6. Thus, the oil separation system 8 is disposed in the refrigerant discharge connection between the compressors and the condenser, as will appear. The refrigerant is reduced to its condensing temperature and pressure in the condenser 6 which is connected by a conduit 10 to an enlarged T-connection conduit or base 11 forming part of a surge-type receiver 12 forming a liquid refrigerant source for operating the system. A pressure responsive flooding valve 13 may be provided in the conduit 10 and operates in response to a head pressure pilot control 14, which is connected to a pressure equalizing line 15 between the receiver 12 and condenser 6, to restrict condensate flow from the condenser and produce variable condenser flooding to maintain compressor head pressures at or above a preselected minimum. The equalizing line has a check valve 16. The outlet 18 of the receiver 12 is connected to a liquid header 19 for conducting liquid refrigerant to branch liquid lines or conduits 20 leading to evaporator coils 21, 22, 23 and 24 associated with different refrigerated fixtures (not shown) and being representative of numerous evaporators connected into the refrigerant system. The branch liquid line 20 of each evaporator 21, 22, 23 and 24 is provided with a solenoid valve 25, and expansion valves 26 meter refrigerant into the evaporators in a conventional manner. The outlets of the evaporators are connected to three-way valves 27 and, under normal refrigerating operation, are connected through these valves and branch suction lines or conduits 28 to a suction header 29 connected to the suction side 3 of the compressors 1 and 2 and through which vaporous refrigerant from the evaporators is returned to the compressors to complete the basic refrigeration cycle.

Evaporator pressure regulator (EPR) valves 30 are shown interposed in the branch suction lines 28 to illustrate that the suction pressure on the evaporator coils 21, 22, 23 and 24 can be adjusted so that the respective refrigerated fixtures can operate at different temperatures within the range of the suction pressures established by the compressors 1 and 2.

The refrigeration system so far described operates in a conventional manner in that each fixture evaporator absorbs heat from the fixture or its product load thereby heating and vaporizing the refrigerant and resulting in the formation of frost or ice on the evaporator coils. Thus, the refrigerant gas returned to the compressor has a cumulative latent heat load in excess of the amount of heat required to defrost one or more of the evaporators 21, 22, 23 and 24. A hot gas defrosting system includes a main gas defrost header 33 connected to the top of the receiver 12 for conducting saturated gaseous refrigerant selectively to the evaporator coils and is connected through branch defrost lines or conduits 34 to the three-way valves 27, the three-way valve for the evaporator 24 being shown in defrost position. In other words, in the gas defrost arrangement shown, the sensible and latent heat of gaseous refrigerant at its desuperheated or saturation temperature is used for defrosting the evaporators and saturated gaseous refrigerant flows through the header 33, the branch line 34 and the three-way valve 27 into the evaporator coil 24 (or another selected evaporator) for heating and defrosting the coil thereby condensing the refrigerant to a liquid as in a conventional condenser. The solenoid valve 25 is closed to isolate the defrosting evaporator from its normal refrigeration connection to the liquid line 19, and a check valve 35 is provided in by-pass line 36 around the expansion valve 26 to return the defrost condensate to the liquid line 19 as taught by U.S. Pat. No. 3,150,498 so that such refrigerant is immediately available for use in the normal operation of the refrigerating evaporators. A pressure reducing or regulating valve 37 is positioned in the liquid header 19 between the branch liquid supply lines 20 and the receiver 12 or its flow-through T-connection 11 to effect a downstream pressure reduction in the range of 10–20 psig in the liquid line 19 relative to the pressure in the defrost header 33, and the liquid header may also be provided with a conventional evaporative sub-cooler 38 for preventing flash gas as a result of the liquid line pressure reduction through the pressure regulator valve 37. In addition, as the compressor discharge line 9 downstream of the oil separation system 8 is connected by the equalizing line 15 to the receiver 12, a pressure regulating valve 39 may be provided in a branch conduit 40 also connected to the receiver 12 in by-pass relation to the one-way check valve 16 to maintain a substantially constant head in the receiver and a continuous supply of saturated gas during defrost operations. The construction and operation of the system so far described will be fully understood by reference to U.S. Pat. No. 3,427,819.

The oil separation system 8 shown in FIGS. 1, 6 and 8 includes the oil separator unit 7, which in its preferred form includes an oil reservoir to be described. Oil separated from the refrigerant in the oil separator portion and collected in the reservoir portion of the unit 7 is returned to the compressors 1 and 2. An oil line 41 connects the bottom of the reservoir through a service valve 42 and filter 43 to the inlet 44 of a pressure differential valve 45 embodying the present invention, and which has an oil outlet 46 connected by an oil return line 47 to conventional oil float valves 48 sensing the oil level in the respective compressor crankcases and controlling the amount of oil returned thereto. Another service shut-off valve 49 is interposed in the oil return line 47 downstream of the pressure differential valve 45. The function of the pressure differential valve 45 is to reduce the high pressure prevailing in the oil separation unit 7 to a pressure slightly greater than the suction pressure of the compressors 1 and 2 to regulate oil flow into the oil return line 47 and prevent overfeeding of the oil float valves 48, as will be described more fully.

Referring briefly to FIGS. 2-5, the oil separation unit 7 as shown is fully described in parent application Ser. No. 442,967 and in a separate divisional application filed concurrently herewith. The unit 7 includes an upper vapor receiving and oil separating chamber 54, a lower oil accumulator or reservoir chamber 55 and an intermediate oil precipitating or liquifying chamber 56. In operation, the compressor discharge into the separator chamber 54 impinges against a coarse screen surface to induce adherence of oil particles which accumulate on and through the screen member 58 and seep or run down toward the intermediate chamber 56 and accumulator 55. The lower end of the separation chamber 54 has a frusto-conical wall member 62 having a central opening 63 forming an oil collector and concentrating the flow of oil to the intermediate chamber 56. The intermediate chamber 56 has an oil precipitating member 66 and a deflector plate 67 defining the bottom of this chamber which collect and spreads out the oil discharged from the separation chamber 54 thereby creating a slight pressure drop between the intermediate chamber 56 and the accumulator chamber 55. The primary function of the oil screen member 66 is to precipitate or condense oil into a liquid form so that this oil will pass in the form of liquid oil droplets and form a supply of liquid oil in the accumulator chamber 55.

Referring now to FIGS. 6 and 7 wherein one form of an oil pressure differential valve 45 embodying the invention is illustrated diagrammatically and in cross-section, the valve has a main valve body 75 with a central oil inlet chamber 76 connected by inlet coupler 44 to the oil line 41 and an oil outlet chamber 77 connected by outlet coupler 46 to the oil return line 47. These chambers 76 and 77 are connected by an oil passage 78 controlled by a valve element 79 biased toward an open oil flow position by pressure spring 80, which has an adjustable lock nut 81 with a through passage 82 and Allen wrench socket 82a to vary the pressure setting. Opening and closing of the valve element 79 is regulated by a pressure responsive diaphragm 83 mounted in a valve control head 84, the upper surface of the diaphragm 83 being in fluid pressure communication with the oil return line 47 through an equalizing line 85 and the lower diaphragm surface being in communication with the suction line 29 through an equalizer conduit 86. It should be noted that the valve 79 is biased upwardly toward an open position by action of the spring 80 acting on spring retainer 80a and through valve stem 79a, but that the valve 79 is also controlled by the diaphragm 83 acting on pressure plate 83a and through a plunger 87 and upper valve stem 87a upon the valve head 79 in opposition to the spring force. The plunger 87 is sealably movable in bore 88, and the diaphragm pressure plate 83a normally seats on spaced lugs 89 on the main valve body 75 so that the suction pressure established through line 86 and cross-bores 86a is effective on the entire lower diaphragm area. Thus, the purpose of the pressure regulating valve 45 is to reduce the high side pressure acting on the oil levels in the reservoir unit 55 to a preselected value in the range of the low side or suction pressure so that the oil float valves 48 can operate efficiently in controlling oil make-up levels to the compressor crankcases. The valve 45 has an adjustment range of about 5 to 40 psig differential pressure, which adjustment is carried out by closing off service valves 42 and 49 and removing the inlet coupling 44 so that the spring lock nut 82 can be rotated to increase or decrease the pressure setting. In this manner an oil inlet pressure of about 175 psig may be reduced to an oil outlet pressure of about 50 psig with a suction line equalization to about 30 psig. It should be noted that the pressure regulating valve 45 is not responsive to variable compressor head pressures, which do not become part of the oil regulating equation, and the differential established is between oil return line pressure and the suction pressure.

Referring now to FIGS. 8 and 9, the pressure regulating valve 45A is similar in construction and operation to that of FIGS. 6 and 7, except for two changes. The oil inlet line 41 is coupled to an inlet fitting 91 connected to the chamber 76 through the side wall of the main valve body 75 and the spring lock nut 92 is imperforate and seals the lower end of the chamber 76 and has its adjustment lock nut 93 directly accessible at the lower end of the valve 45 whereby spring tension and adjustment of its pressure setting can be made directly at the bottom opening of the housing without disconnecting any oil connection or shutting down the system 8. The other major change in the valve 45A is to provide the oil equalizing line 85A with a direct connection 94 and internal port 95 to the oil outlet chamber 77 thereby simplifying installation and servicing of the oil separation system 8.

It will be readily apparent that the pressure regulating valve 45,45A of the present invention maintains a preselected low side pressure differential between the oil return line 47 and suction pressure for effective oil float control of compressor lubrication requirements. The scope of this invention is intended to encompass such changes and modifications as will be apparent to those skilled in the art, and is only to be limited by the scope of the claims which follow.

What is claimed is

1. In an oil separation system for a refrigeration system having compressor means with a high pressure discharge side and a low pressure suction side, and which system includes oil reservoir means forming a high pressure source of liquid oil, and oil delivery means having oil level control means comprising an oil float valve sensing the oil level in said compressor means and adapted to feed oil upon demand to maintain a predetermined oil level for said compressor means; the improvement comprising pressure differential valve means adapted to be disposed in an oil return line between said oil reservoir means and said oil float valve, said pressure differential valve including pressure regulating means constructed and arranged to produce a substantial drop in oil pressure thereacross from the high side oil pressures prevailing in said reservoir means to a preselected low side pressure differential relative to the suction pressure of said compressor means.

2. The improved pressure differential valve according to claim 1, in which said pressure regulating means includes spring means for establishing a fixed pressure relationship between compressor suction pressure and downstream oil pressure, and means for adjusting said spring means for changing the selected pressure differential.

3. The improved pressure differential valve according to claim 1, in which said pressure differential valve means comprises an oil inlet chamber in high side pressure communication with said oil reservoir means, an oil outlet chamber in low side pressure communication with said oil level control means for said compressor means, spring-loaded check valve means adapted to open to establish oil flow between said high side and low side chambers, and movable pressure means responsive to oil outlet pressure and compressor suction pressure acting in opposition thereon and being engagable to close said check valve in opposition to the spring force thereon to control oil flow between said high side and low side chambers and maintain a preselected differential pressure of the low side oil outlet relative to the low side suction pressure.

4. The improved pressure differential valve according to claim 3, in which said movable pressure means comprises a flexible diaphragm being acted on in one direction by said spring-loaded check valve means biased toward an open position, one side of said diaphragm being pressurized in said one direction by fluid communication with said compressor suction side, and the other side of said diaphragm being pressurized by fluid communication with said oil outlet to move in the opposite direction and act toward closing said check valve.

5. The improved pressure differential valve according to claim 4, in which said fluid communication between said oil outlet side and said other side of said diaphrgam comprises an internal equalizer connection between said low side chamber and said other side of said diaphragm.

6. The improved pressure differential valve according to claim 3, in which said check valve is biased toward an open position by spring means having an adjustable seat for varying the pressure setting thereof whereby the preselected differential pressure of said valve can be regulated, and said high side chamber is in open fluid communication with said spring means.

7. The improved pressure differential valve according to claim 6, in which said adjustable seat is ported to establish said fluid communication between said oil reservoir means and said oil inlet chamber.

8. The improved pressure differential valve according to claim 6, in which said oil inlet chamber is connected to said oil reservoir by a lateral port connection independent of said adjustable seat of said spring means.

9. A pressure differential valve adapted to be disposed for use between oil separator means having oil reservoir means as a source of liquid oil and the compressor means of a refrigeration system, said pressure regulating valve comprising an oil inlet chamber adapted for high side pressure communication with said oil reservoir means, an oil outlet chamber adapted for low side pressure communication with said compressor means, spring-loaded check valve means adapted to open to establish oil flow between said high side and low side chambers, and movable pressure means responsive to oil outlet pressure and compressor suction pressure acting in opposition thereon and being engagable to close said check valve in opposition to the spring force thereon to control oil flow between said high side and low side chambers and maintain a preselected differential pressure of the low side oil outlet relative to the low side suction pressure.

10. The pressure differential valve according to claim 9, in which said check valve is biased toward an open position by a spring means having an adjustable seat for varying the pressure setting thereof whereby the preselected differential pressure of said valve can be regulated.

11. The pressure differential valve according to claim 9, which includes an internal equalizer connection between said low side chamber and the side of said movable pressure means responsive to said oil outlet pressure.

12. An oil control valve for use in an oil separation system for a multiple compressor refrigeration system in which oil and refrigerant separating means and oil reservoir means are provided on the high pressure discharge side of said compressors and which also has oil level sensing and feeding means for the respective compressors, said oil control valve being adapted to be disposed in said oil separation system between said high pressure oil reservoir and said oil level sensing and feeding means for at least one of said multiple compressors, said oil control valve comprising an oil inlet chamber and an oil outlet chamber, and pressure differential means responsive to a preselected low side pressure differential for producing a substantial oil pressure drop thereacross.

13. The oil control valve according to claim 12, including a spring-loaded check valve for regulating fluid communication between said inlet and outlet chambers, and said pressure differential means being adapted to be acted on in opposing directions by the low side suction pressure of said one compressor and the low side pressure of said oil outlet chamber.

14. The oil control valve according to claim 13, in which multiple compressors of the refrigeration system have a common suction header and are adapted to operate at substantially the same suction pressure, whereby said oil control valve is adapted to provide a substantially uniform oil delivery pressure to the sensing and feeding means of each of said compressors.

15. The oil control valve according to claim 13, in which multiple compressors of the refrigeration system are adapted to operate at different suction pressures and plural oil control valves may be used to regulate oil delivery to the sensing and feeding means of each of said compressors, each of such oil control valves being responsive to the pressure differential between its compressor's suction pressure and its own downsteam oil outlet pressure for operating the check valve thereof.

* * * * *